(12) United States Patent
Takahashi et al.

(10) Patent No.: US 8,779,330 B2
(45) Date of Patent: Jul. 15, 2014

(54) VEHICLE HEATER CONTROL APPARATUS

(75) Inventors: Tadashi Takahashi, Chiyoda-ku (JP); Yosuke Fukuzawa, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 13/252,782

(22) Filed: Oct. 4, 2011

(65) Prior Publication Data

US 2012/0261398 A1 Oct. 18, 2012

(30) Foreign Application Priority Data

Apr. 12, 2011 (JP) ................. 2011-088446

(51) Int. Cl.
*B60L 1/02* (2006.01)
*H05B 3/00* (2006.01)

(52) U.S. Cl.
USPC .......................... 219/205; 219/200; 219/208

(58) Field of Classification Search
USPC ................................................. 219/200–208
See application file for complete search history.

(56) References Cited

FOREIGN PATENT DOCUMENTS

| JP | 63-203410 A | 8/1988 |
|---|---|---|
| JP | 01-262224 A | 10/1989 |
| JP | 05-124428 A | 5/1993 |
| JP | 2002-096630 A | 4/2002 |
| JP | 2005-255078 A | 9/2005 |
| JP | 2008-121683 A | 5/2008 |
| JP | 2009-173274 * | 8/2009 |
| JP | 2009-173274 A | 8/2009 |
| JP | 2009-185765 * | 8/2009 |
| JP | 2009-185765 A | 8/2009 |
| JP | 2010-057354 A | 3/2010 |
| JP | 2010-284045 A | 12/2010 |
| WO | 2005/083257 A1 | 9/2005 |

OTHER PUBLICATIONS

Japanese Office Action, dated Sep. 11, 2012, issued in corresponding Japanese Application No. 2011-088446.

\* cited by examiner

*Primary Examiner* — Shawntina Fuqua
(74) *Attorney, Agent, or Firm* — Sughrue Mion, PLLC

(57) ABSTRACT

A vehicle heater control apparatus variably controls electric power to be supplied to a heater with an inexpensive configuration and simple control. The vehicle heater control apparatus is provided in a vehicle including an engine control system, the engine control system including: an intake air temperature sensor for detecting an intake air temperature; and a speed sensor for detecting a traveling state of the vehicle, the engine control system using the intake air temperature and the traveling state to control drive of the engine, and the vehicle heater control apparatus includes a heater control portion for variably controlling electric power to be supplied to a warmer provided to a heated part of the vehicle based on the intake air temperature and the traveling state.

4 Claims, 4 Drawing Sheets

|  |  | JUDGED CHANGE IN INTAKE AIR PRESSURE | | |
|---|---|---|---|---|
|  |  | ACCELERATION | DECELERATION | STEADY |
| JUDGED CHANGE IN THROTTLE POSITION | ACCELERATION | 20 | 20 | 20 |
|  | DECELERATION | −20 | −20 | −20 |
|  | STEADY | 20 | 0 | 0 |

FIG. 2

| TEMPERATURE [° C] \ BATTERY VOLTAGE [V] | 8 | 10 | 12 | 14 | 16 |
|---|---|---|---|---|---|
| 30 | 0 | 0 | 0 | 0 | 0 |
| 20 | 0 | 5 | 5 | 5 | 5 |
| 10 | 0 | 5 | 10 | 10 | 10 |
| 0 | 0 | 5 | 10 | 15 | 20 |
| −10 | 0 | 10 | 15 | 25 | 30 |
| −20 | 0 | 10 | 20 | 30 | 40 |
| −30 | 0 | 10 | 30 | 40 | 50 |

FIG. 3

| TEMPERATURE [° C] \ VEHICLE SPEED [km/h] | 0 | 30 | 60 | 90 | 120 |
|---|---|---|---|---|---|
| 30 | 0 | 0 | 0 | 0 | 0 |
| 20 | 0 | 1 | 2 | 3 | 4 |
| 10 | 5 | 5 | 5 | 5 | 6 |
| 0 | 8 | 8 | 8 | 8 | 8 |
| -10 | 9 | 9 | 10 | 10 | 10 |
| -20 | 9 | 9 | 10 | 10 | 10 |
| -30 | 10 | 10 | 10 | 10 | 10 |

FIG. 4A

| TEMPERATURE LEVEL [-] \ ENGINE REVOLUTION SPEED [r/min] | 0 | 1 | 2 | 3 | 4 | 5 | 6 | 7 | 8 | 9 | 10 |
|---|---|---|---|---|---|---|---|---|---|---|---|
| 1500 | 0 | 30 | 30 | 30 | 30 | 30 | 30 | 30 | 30 | 30 | 30 |
| 3000 | 0 | 30 | 30 | 30 | 35 | 40 | 45 | 50 | 55 | 60 | 65 |
| 5000 | 0 | 30 | 30 | 30 | 40 | 50 | 60 | 70 | 80 | 90 | 100 |

FIG. 4B

| TEMPERATURE LEVEL [-] \ ENGINE REVOLUTION SPEED [r/min] | 0 | 1 | 2 | 3 | 4 | 5 | 6 | 7 | 8 | 9 | 10 |
|---|---|---|---|---|---|---|---|---|---|---|---|
| 1500 | 0 | 10 | 10 | 10 | 10 | 10 | 10 | 10 | 10 | 10 | 10 |
| 3000 | 0 | 10 | 10 | 10 | 15 | 20 | 25 | 30 | 35 | 40 | 45 |
| 5000 | 0 | 10 | 10 | 10 | 20 | 30 | 40 | 50 | 60 | 70 | 80 |

FIG. 4C

VEHICLE HEATER CONTROL APPARATUS

BACKGROUND OF THE INVENTION

1. Field of the Invention

The present invention relates to a vehicle heater control apparatus for controlling a warmer (heater) provided to, for example, a seat or the like of a vehicle.

2. Description of the Related Art

Generally, a vehicle such as a motorcycle or an automobile is provided with warmers for keeping respective parts warm. For example, warmers are provided to grip handle parts of a motorcycle, and warmers are provided to an accelerator part and seat parts of an automobile. A vehicle heater control apparatus controls electric power to be supplied to the warmers, to thereby keep respective parts warm and provide comfortable riding environment to a driver and a fellow passenger.

A conventional vehicle heater control apparatus includes a heater provided to a heated part of a vehicle, control means for controlling electric power to be supplied to the heater from a battery, vehicle speed detecting means for detecting a travel speed of the vehicle, and temperature monitoring means for monitoring the temperature of the heated part, and the control means varies the electric power to be supplied to the heater depending on a vehicle speed signal from the vehicle speed detecting means and a temperature signal from the temperature monitoring means, to thereby control the temperature of the heated part to be kept constant (see, for example, Japanese Patent Application Laid-open No. 2005-255078).

A currently dominant temperature setting method for the heater control uses two temperature setting switches for increasing and decreasing the temperature, respectively. Another temperature setting method uses one temperature setting switch to perform rotary temperature setting. Note that, the rotary temperature setting refers to setting in which the set temperature once reaches the upper limit set value and then returns to the lower limit set value as in the order of "low temperature→intermediate temperature→high temperature→low temperature→intermediate temperature→high temperature→low temperature . . . . "

Specifically, in the conventional vehicle heater control apparatus, a passenger operates the temperature setting switch to set a desired temperature, and the control means judges whether the vehicle is in a traveling state or in a stopped state from the vehicle speed signal, and obtains the temperature of the heated part from the temperature signal, to thereby vary the electric power to be supplied to the heater so that the heated part is kept at the set temperature.

However, the conventional technology has the following problems.

In the vehicle heater control apparatus disclosed in Japanese Patent Application Laid-open No. 2005-255078, there is a need to provide the special temperature setting switch, and the temperature monitoring means such as a thermister for monitoring the temperature of the heated part, which leads to a problem of an increased cost. Further, the control means varies the electric power to be supplied to the heater by feedback control based on the temperature signal from the temperature monitoring means, which leads to another problem of complicated control.

SUMMARY OF THE INVENTION

The present invention has been made to solve the above-mentioned problems, and therefore has an object to provide a vehicle heater control apparatus capable of variably controlling electric power to be supplied to a heater with an inexpensive configuration and simple control.

According to the present invention, there is provided a vehicle heater control apparatus to be mounted to a vehicle including an engine control system, the engine control system including: a temperature detecting portion for detecting one of an outside air temperature surrounding the vehicle and an intake air temperature of air to be sucked in an engine of the vehicle; and a traveling state detecting portion for detecting a traveling state of the vehicle, the engine control system using the traveling state and the one of the outside air temperature and the intake air temperature to control drive of the engine, the vehicle heater control apparatus including: a heater provided to a heated part of the vehicle; and a heater control portion for variably controlling electric power to be supplied to the heater based on the traveling state and the one of the outside air temperature and the intake air temperature.

The vehicle heater control apparatus according to the present invention is mounted to the vehicle including the engine control system, the engine control system including: the temperature detecting portion for detecting the one of the outside air temperature surrounding the vehicle and the intake air temperature of the air to be sucked in the engine of the vehicle; and the traveling state detecting portion for detecting the traveling state of the vehicle, the engine control system using the traveling state and the one of the outside air temperature and the intake air temperature to control the drive of the engine, and the heater control portion variably controls the electric power to be supplied to the heater provided to the heated part of the vehicle based on the traveling state and the one of the outside air temperature and the intake air temperature.

Therefore, there may be obtained a vehicle heater control apparatus capable of variably controlling electric power to be supplied to a heater with an inexpensive configuration and simple control.

BRIEF DESCRIPTION OF THE DRAWINGS

In the accompanying drawings:

FIG. 2 is an explanatory diagram illustrating a map of correction values for acceleration/deceleration in the vehicle heater control apparatus according to the first embodiment of the present invention;

FIG. 3 is an explanatory diagram illustrating a map of output values for starting in the vehicle heater control apparatus according to the first embodiment of the present invention;

FIGS. 4A to 4C are explanatory diagrams illustrating maps of reference energies and load driving energies in the vehicle heater control apparatus according to the first embodiment of the present invention.

DETAILED DESCRIPTION OF THE PREFERRED EMBODIMENT

Figure 1:
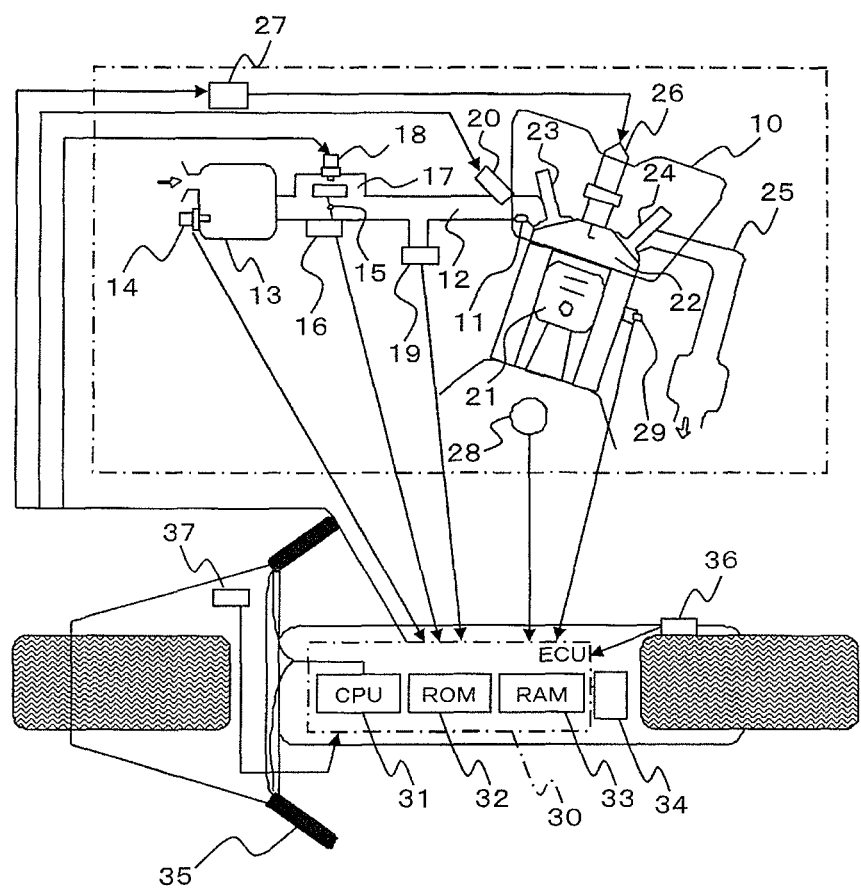
FIG. 1 is a configuration diagram illustrating an entire engine control system including a vehicle heater control apparatus according to a first embodiment of the present invention.

Hereinafter, a preferred embodiment of a vehicle heater control apparatus according to the present invention is described with reference to the accompanying drawings, throughout which the same or corresponding parts are denoted by the same reference numerals and symbols for description.

Note that, in the following embodiment, there is described a vehicle in which the vehicle heater control apparatus is mounted, which is exemplified by a vehicle, such as a motorcycle, a motor scooter, a snowmobile, or an all terrain vehicle (ATV), including grip handle parts provided with warmers, in which the grip handle parts (seat) are exposed to the outside air. Here, the vehicle may be an automobile or the like including an accelerator part and a seat part provided with warmers.

In such vehicle, the vehicle heater control apparatus variably controls electric power to be supplied to a heater based on information acquired by an electronic control unit (ECU) for controlling a fuel injection amount, ignition timing, and the like of an engine. At this time, a heater control portion for variably controlling the electric power to be supplied to the heater may be a separate portion or, as in the following embodiment, may be integrated into the electronic control unit (engine control system). In a case where the heater control portion is integrated into the electronic control unit, the configuration may be simplified.

First Embodiment

FIG. 1 is a configuration diagram illustrating the entire engine control system including a vehicle heater control apparatus according to a first embodiment of the present invention. In FIG. 1, an engine 10 includes an intake port 11 connected to an intake pipe 12. On an upstream side of the intake pipe 12, an air box 13 for sucking outside air is connected. Attached to the air box 13 is an intake air temperature sensor 14 (temperature detecting portion) for detecting the temperature of intake air.

Halfway through the intake pipe 12, there are provided a throttle valve 15 and a throttle position sensor 16 (throttle position detecting portion) for detecting a throttle position of the throttle valve 15. Further, in the intake pipe 12, a bypass air mechanical portion 17 is provided so as to sandwich the throttle valve 15. To the bypass air mechanical portion 17, an idle speed control (ISC) stepper motor 18 is provided.

Further, on a downstream side of the throttle valve 15, there is attached to the intake pipe 12 an intake air pressure sensor 19 (intake air detecting portion) for detecting an intake air pressure on the downstream side of the throttle valve 15 (pressure inside the intake pipe). In the vicinity of the intake port 11, a fuel injection valve 20 (injector) is attached. The fuel injection valve 20 injects a fuel supplied from a fuel supply system (not shown) to the intake port 11.

Further, in the engine 10, there is provided a piston 21 which is connected to a crank shaft (not shown) for reciprocal movement, and above the piston 21, there is formed a combustion chamber 22. The combustion chamber 22 communicates with the intake pipe 12 and an exhaust pipe 25 through an intake valve 23 and an exhaust valve 24, respectively. Further, the engine 10 includes a cylinder head to which a spark plug 26 is attached. The spark plug 26 sparks when applied with a high voltage generated on a secondary side of an ignition coil 27 at each ignition timing.

Further, to the crankshaft of the engine 10, there is attached an engine rpm sensor 28 for detecting the revolutions per minute (rpm) of the engine 10. The engine rpm sensor 28 outputs a revolution pulse signal for each predetermined crank angle. Also attached to the engine 10 is a water temperature sensor 29 for detecting the temperature of engine cooling water.

An electronic control unit 30 is mainly constituted of a well-known microcomputer including a central processing unit (CPU) 31, a read-only memory (ROM) 32, a random access memory (RAM) 33, and the like. To the electronic control unit 30, power is supplied from a battery 34. Further, to the electronic control unit 30, the detection signals are input from the intake air temperature sensor 14, the throttle position sensor 16, the intake air pressure sensor 19, the engine rpm sensor 28, and the water temperature sensor 29 described above.

The CPU 31 detects engine states such as the intake air temperature, the throttle position, the intake air pressure, the engine revolution speed, and the cooling water temperature based on the detection signals. Further, the CPU 31 executes a control program stored in advance in the ROM 32 or other such programs, to thereby execute as appropriate the fuel injection amount control with the fuel injection valve 20, the ignition timing control with the spark plug 26, the drive control of the ISC stepper motor 18, or other such control on accessories associated with engine control.

Further, in FIG. 1, the vehicle includes a grip handle part (heated part) provided with a warmer 35 (heater). Further, the vehicle has wheels to which a speed sensor 36 (traveling state detecting portion) for detecting a traveling state of the vehicle is attached. Provided also to the vehicle is a starter switch 37 (start time detecting portion) for detecting a starting state of the engine 10. Further, the heater control portion of the vehicle heater control apparatus is incorporated as a function of the CPU 31.

Next, the function of the heater control portion is described.

The heater control portion calculates the electric power to be supplied to the warmer 35 based on the intake air temperature detected from the detection signal of the intake air temperature sensor 14, and on the traveling state of the vehicle detected from the detection signal of the speed sensor 36, and outputs the calculated electric power as a heater drive command to the warmer 35. The electric power calculated here is set as a reference energy.

At this time, the heater control portion uses, for example, a three-dimensional map (see FIGS. 4A to 4C described later) so that the electric power to be supplied to the warmer 35 may be calculated depending on the intake air temperature and the traveling state of the vehicle. Note that, the heater control portion may use, instead of the intake air temperature, the outside air temperature to calculate the reference energy. In this manner, the reference energy maybe calculated based on the intake air temperature and the traveling state of the vehicle, and the heater drive command may be output to the warmer 35, without using the conventional temperature setting switch.

Further, the heater control portion calculates an increased/decreased speed of the vehicle based on the throttle position detected from the detection signal of the throttle position sensor 16, and on the intake air pressure detected from the detection signal of the intake air pressure sensor 19, and calculates a correction value for the reference energy based on the increased/decreased speed. The correction value for the reference energy is referred to as a correction value for acceleration/deceleration. The heater control portion uses the correction value for acceleration/deceleration to correct the heater drive command, and outputs the corrected heater drive command to the warmer 35.

In this example, the heater control portion uses a map as illustrated in, for example, FIG. 2 so that the electric power to be supplied to the warmer 35 may be corrected depending on an amount of change in throttle position and an amount of change in intake air pressure. At this time, the correction values for acceleration/deceleration illustrated in FIG. 2 are set so that, when added or integrated to a load driving energy during operation of the engine (to be described later) or the reference energy, an appropriate heater drive command is obtained. Note that, the heater control portion may use, instead of the intake air pressure, an intake air amount to calculate the correction value for acceleration/deceleration.

In this manner, although the passenger's sense for sensing the temperature changes at the time of acceleration/deceleration of the vehicle, the reference energy may be corrected based on the throttle position and the intake air pressure, and the heater drive command may be output to the warmer 35, without using the conventional temperature setting switch.

Further, when the starting state of the engine 10 is detected from the detection signal of the starter switch 37, the heater control portion monitors a battery voltage to calculate the correction value for the reference energy in consideration of the electric power consumed at the time of starting the vehicle depending on the temperature and the state of the battery 34, and outputs the corrected heater drive command to the warmer 35. The correction value for the reference energy is referred to as an output value for starting.

In this example, the heater control portion uses a map as illustrated in, for example, FIG. 3 referencing the temperature and the battery voltage so that the electric power to be supplied to the warmer 35 may be corrected depending on the starting state of the engine 10. Further, the heater control portion determines whether or not to output the output value for starting as the heater drive command depending on whether or not the engine 10 is executing the start operation. Note that, the period for judging the start of the engine 10 is a predetermined period after the detection of the starting state of the engine 10.

With this configuration, during a period in which the passenger is performing the start operation of the engine 10, the power consumption of the vehicle is increased, and hence, in order to give precedence to the starting of the engine 10 in consideration of the effect of the lowered battery voltage, the output value for starting may be calculated by decreasingly correcting the reference energy, and the heater drive command may be output to the warmer 35.

Further, depending on the load driving condition of the vehicle, the heater control portion decreasingly corrects the reference energy and outputs the corrected heater drive command to the warmer 35 when the load is high. The decreased reference energy is referred to as the load driving energy. Specifically, the heater control portion detects that the vehicle is in a high-load state based on whether or not the power consumption of the vehicle is increasing.

If the heater control portion judges that the vehicle is not in the high-load state, the heater control portion determines a temperature level from a map as illustrated in, for example, FIG. 4A based on the intake air temperature and a vehicle speed (the traveling state of the vehicle). Subsequently, the heater control portion calculates the reference energy from a map as illustrated in FIG. 4B based on the temperature level and the engine revolution speed.

If, on the other hand, the heater control portion judges that the vehicle is in the high-load state, the heater control portion determines the temperature level from the map as illustrated in, for example, FIG. 4A based on the intake air temperature and the vehicle speed. Subsequently, the heater control portion calculates the load driving energy from a map as illustrated in FIG. 4C based on the temperature level and the engine revolution speed.

In this manner, if the vehicle is in the high-load state, the load driving energy obtained by decreasingly correcting the reference energy is calculated, and the heater drive command is output to the warmer 35, to thereby realize the protection of the battery 34 and the stabilization of the vehicle feeling.

Note that, if the engine 10 is stopped, the heater control portion outputs the heater drive command to set the energy to 0 in fear of a reduced voltage of the battery 34.

Figure 5:
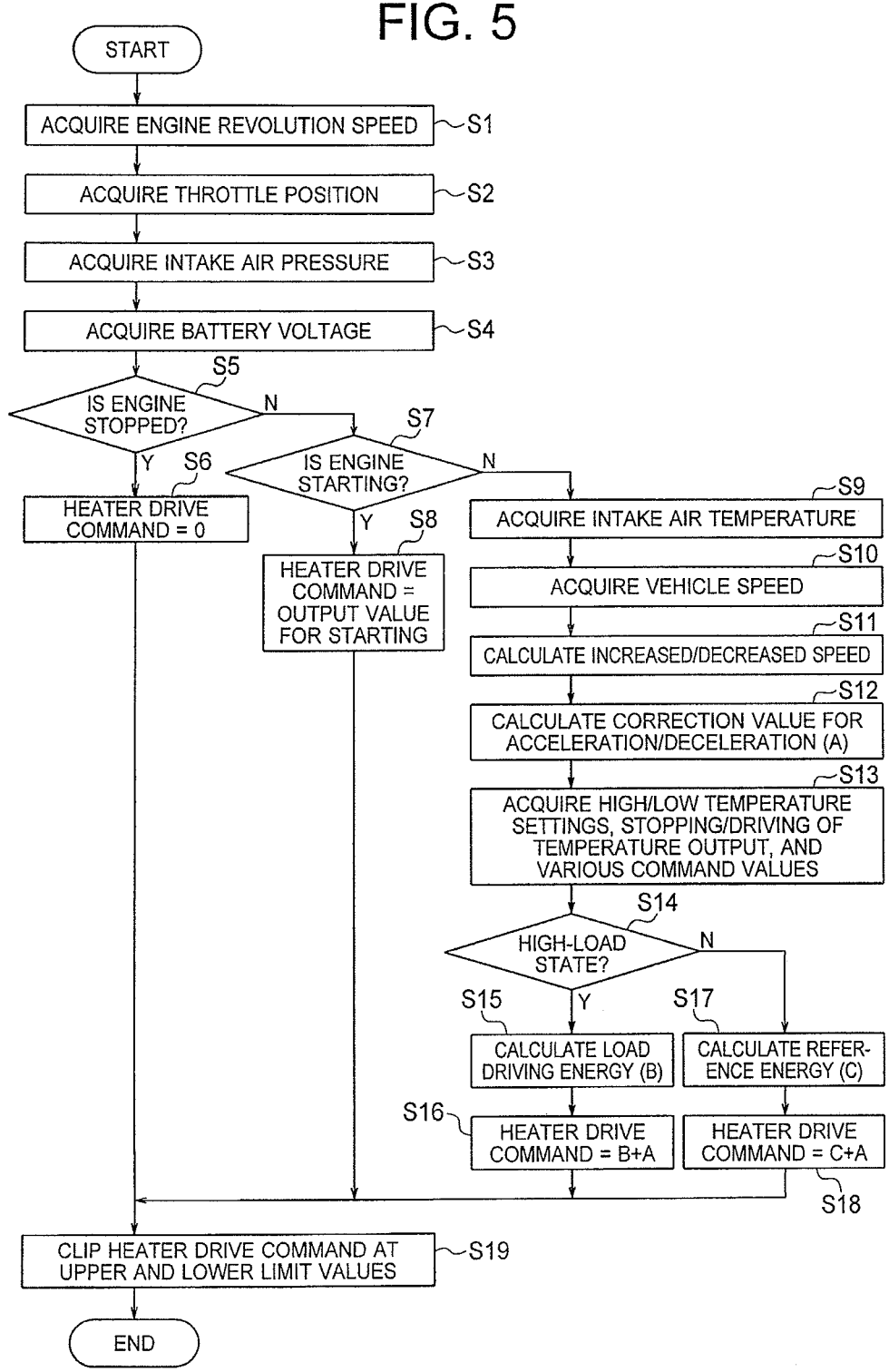
FIG. 5 is a flow chart illustrating operation of a control portion of the vehicle heater control apparatus according to the first embodiment of the present invention.

Next, referring to a flow chart of FIG. 5, operation of the heater control portion is described. Note that, the operation is repeatedly executed at predetermined intervals.

First, the heater control portion acquires the engine revolution speed, the throttle position, the intake air pressure (intake air amount), and the battery voltage (Steps S1 to S4).

Subsequently, the heater control portion judges, from the values obtained in Steps S1 to S4, whether or not the engine 10 is stopped (Step S5).

If it is judged in Step S5 that the engine 10 is stopped (that is, Yes), the heater control portion outputs the heater drive command to set the energy to 0 (Step S6), and the process proceeds to Step S19.

If it is judged in Step S5 that the engine 10 is not stopped (that is, No), on the other hand, the heater control portion judges whether or not the engine 10 is in the starting state (Step S7).

If it is judged in Step S7 that the engine 10 is in the starting state (that is, Yes), the heater control portion outputs the output value for starting as the heater drive command (Step S8), and the process proceeds to Step S19.

If it is judged in Step S7 that the engine 10 is not in the starting state (that is, No), on the other hand, the heater control portion acquires the intake air temperature (outside air temperature) and the vehicle speed (the traveling state of the vehicle) (Steps S9 and S10).

Next, the heater control portion calculates the increased/decreased speed of the vehicle based on the throttle position and the intake air pressure (Step S11).

Subsequently, the heater control portion calculates a correction value for acceleration/deceleration (A) depending on the calculated increased/decreased speed of the vehicle (Step S12).

Next, in order to judge whether or not the power consumption of the vehicle is increasing, the heater control portion acquires high/low temperature settings, stopping or driving of the temperature output, and various command values (Step S13).

Subsequently, the heater control portion judges whether or not the vehicle is in the high-load state (Step S14).

If it is judged in Step S14 that the vehicle is in the high-load state (that is, Yes), the heater control portion calculates a load driving energy (B) based on the intake air temperature, the vehicle speed, and the engine revolution speed (Step S15), and outputs a value obtained by adding the load driving energy (B) and the correction value for acceleration/deceleration (A) as the heater drive command (Step S16), and the process proceeds to Step S19.

If it is judged in Step S14 that the vehicle is not in the high-load state (that is, No), on the other hand, the heater control portion calculates a reference energy (C) based on the intake air temperature, the vehicle speed, and the engine revolution speed (Step S17), and outputs a value obtained by adding the reference energy (C) and the correction value for acceleration/deceleration (A) as the heater drive command (Step S18), and the process proceeds to Step S19.

Next, the heater control portion clips the heater drive commands output from Steps S6, 8, 16, and 18 at upper and lower limit values, and matches the calculation result and the actual drive range (Step S19), and the process of FIG. 5 is ended.

In this manner, even though the sense for sensing the temperature changes in a period in which the passenger is performing the driving operation, the heater drive command to the warmer 35 may be automatically corrected at any time.

As described above, according to the first embodiment, the vehicle heater control apparatus is mounted to the vehicle including the engine control system, the engine control system including: the temperature detecting portion for detecting one of the outside air temperature surrounding the vehicle and the intake air temperature of the air to be sucked in the engine of the vehicle; and the traveling state detecting portion for detecting the traveling state of the vehicle, the engine control system using the traveling state and the one of the outside air temperature and the intake air temperature to control drive of the engine, and the heater control portion variably controls the electric power to be supplied to the heater provided to the heated part of the vehicle based on the traveling state and the one of the outside air temperature and the intake air temperature.

Therefore, there may be obtained the vehicle heater control apparatus capable of variably controlling the electric power to be supplied to the heater with the inexpensive configuration and the simple control.

In other words, when the heater is mounted to the finished vehicle as a standard or optional feature, an existing sensor or the like connected to the electronic control unit may be used to output the heater drive command to the heater. Therefore, there is no need to provide a special temperature setting switch, and hence the cost may be decreased.

In addition, open-loop control which eliminates the need for the temperature monitoring means such as a thermister for monitoring the heater temperature of the heated part may be used to output the heater drive command to the heater, with the result that the control may be simplified and the cost may be further decreased.

Further, the heater drive command to the heater may be automatically corrected, and hence it is possible to avoid bothering the driver's driving.

What is claimed is:

1. A vehicle heater control apparatus to be mounted to a vehicle comprising an engine control system, the engine control system comprising:

a temperature detecting portion for detecting one of an outside air temperature surrounding the vehicle and an intake air temperature of air to be sucked in an engine of the vehicle; and a traveling state detecting portion for detecting a traveling state of the vehicle, the engine control system using the traveling state and the one of the outside air temperature and the intake air temperature to control drive of the engine, the vehicle heater control apparatus comprising:

a heater provided to a heated part of the vehicle; and a heater control portion for calculating electric power to be supplied to the heater based on the traveling state and the one of the outside air temperature and the intake air temperature, and outputting a heater drive command to the heater, wherein the heater control portion corrects the heater drive command depending on a load driving condition of the vehicle, wherein the load driving condition of the vehicle is at least one of a high-load state and a non-high load state, the high-load state being a state in which the vehicle is increasing power consumption.

2. A vehicle heater control apparatus according to claim 1, wherein the engine control system further comprises:

a throttle position detecting portion for detecting a throttle position of a throttle valve provided in an intake pipe of the engine; and an intake air detecting portion for detecting one of an intake air amount to be sucked in the intake pipe and an intake air pressure in the intake pipe, and wherein the heater control portion calculates an increased/decreased speed of the vehicle based on the throttle position and the one of the intake air amount and the intake air pressure, and corrects the heater drive command depending on the increased/decreased speed.

3. A vehicle heater control apparatus according to claim 1, wherein the engine control system further comprises a start time detecting portion for detecting a starting state of the engine, and wherein the heater control portion corrects the heater drive command based on the starting state.

4. A vehicle heater control apparatus according to claim 1, wherein the heater control portion is integrated into the engine control system.

* * * * *